US008903087B2

(12) United States Patent
Lecomte et al.

(10) Patent No.: US 8,903,087 B2
(45) Date of Patent: Dec. 2, 2014

(54) METHOD AND DEVICE FOR DISTRIBUTING SECURE DIGITAL AUDIOVISUAL CONTENTS BY INTEROPERABLE SOLUTIONS

(75) Inventors: Daniel Lecomte, Paris (FR); Sebastien Dupuis, Paris (FR); Pierre Breese, legal representative, Paris (FR)

(73) Assignee: Nagra France (FR)

( * ) Notice: Subject to any disclaimer, the term of this patent is extended or adjusted under 35 U.S.C. 154(b) by 830 days.

(21) Appl. No.: 12/282,728

(22) PCT Filed: Mar. 12, 2007

(86) PCT No.: PCT/FR2007/050910
§ 371 (c)(1),
(2), (4) Date: Mar. 30, 2009

(87) PCT Pub. No.: WO2007/104887
PCT Pub. Date: Sep. 20, 2007

(65) Prior Publication Data
US 2009/0327692 A1    Dec. 31, 2009

(30) Foreign Application Priority Data

Mar. 13, 2006    (FR) ...................................... 06 50829

(51) Int. Cl.
*H04N 7/167*    (2011.01)
(52) U.S. Cl.
USPC ........... 380/210; 713/150; 709/231; 709/238; 380/200; 380/37; 380/42; 382/232; 455/558
(58) Field of Classification Search
CPC ..................... G06F 17/30017; H04N 1/32187; H04N 7/26942
USPC ...................... 380/210, 200, 37, 42; 713/150; 709/231, 238
See application file for complete search history.

(56) References Cited

U.S. PATENT DOCUMENTS 5,196,933 A    3/1993   Henot
5,937,164 A    8/1999   Mages et al.
(Continued)

FOREIGN PATENT DOCUMENTS

EP    0 778 513 A2    6/1997
EP    1 119 132 A2    7/2001
(Continued)

OTHER PUBLICATIONS

International Standard, "Information Technology—Generic Coding of Moving Pictures and Associated Audio Information: Systems", *ISO/IEC*, 13818-1, Second Edition, Dec. 1, 2000, cover, pp. 1-154.

(Continued)

*Primary Examiner* — Thu Ha Nguyen
*Assistant Examiner* — Arvin Eskandarnia
(74) *Attorney, Agent, or Firm* — DLA Piper LLP (US)

(57) ABSTRACT

A method for distributing a nominal audiovisual stream to a recipient device including modifying, in the nominal audiovisual stream, at least one nominal coefficient among the nominal coefficients to generate a modified main stream; generating complementary information such that the nominal audiovisual stream may be implemented based from the complementary information and on the modified main stream, applying a plurality of methods for protecting the complementary information to generate multiple protected complementary information, each of the protected complementary information enabling the nominal stream of the main stream to be implemented upon application of an access method compatible with the protection method which has been used to protect it; and transmitting to the recipient device the modified main stream and the multiple protected complementary information.

4 Claims, 3 Drawing Sheets

(56) References Cited

U.S. PATENT DOCUMENTS

| | | | |
|---|---|---|---|
| 6,069,957 A | 5/2000 | Richards | |
| 6,332,030 B1 * | 12/2001 | Manjunath et al. | 382/100 |
| 6,886,098 B1 | 4/2005 | Benaloh | |
| 7,327,936 B2 | 2/2008 | Lecomte | |
| 7,428,755 B2 | 9/2008 | Lecomte | |
| 7,613,181 B2 * | 11/2009 | Lecomte et al. | 370/389 |
| 7,639,833 B2 * | 12/2009 | LeComte et al. | 382/100 |
| 7,801,305 B2 | 9/2010 | Lecomte et al. | |
| 7,864,759 B2 | 1/2011 | LeComte et al. | |
| 2002/0026636 A1 | 2/2002 | LeComte | |
| 2003/0091184 A1 * | 5/2003 | Chui | 380/37 |
| 2003/0159139 A1 * | 8/2003 | Candelore et al. | 725/25 |
| 2004/0047470 A1 * | 3/2004 | Candelore | 380/240 |
| 2005/0155073 A1 | 7/2005 | Lecomte | |
| 2005/0185821 A1 | 8/2005 | LeComte et al. | |
| 2005/0193409 A1 | 9/2005 | LeComte et al. | |
| 2005/0223222 A1 * | 10/2005 | Graves et al. | 713/165 |
| 2006/0075135 A1 * | 4/2006 | Rambhia | 709/238 |
| 2006/0184686 A1 | 8/2006 | Lecomte et al. | |
| 2006/0184985 A1 | 8/2006 | LeComte et al. | |
| 2006/0222245 A1 * | 10/2006 | Sakai et al. | 382/232 |
| 2007/0049342 A1 * | 3/2007 | Mayer et al. | 455/558 |

FOREIGN PATENT DOCUMENTS

| | | |
|---|---|---|
| EP | 1 220 541 A2 | 7/2002 |
| EP | 1 329 819 A2 | 7/2003 |
| EP | 1 470 722 A1 | 10/2004 |
| EP | 1 477 009 B1 | 11/2004 |
| EP | 1 547 364 A2 | 6/2005 |
| EP | 1 559 270 A1 | 8/2005 |
| EP | 1 570 672 A1 | 9/2005 |
| EP | 1 673 897 A1 | 6/2006 |
| EP | 1 852 799 A2 | 11/2007 |
| EP | 1 880 506 A1 | 1/2008 |
| EP | 1 588 561 B1 | 10/2010 |
| EP | 1 590 959 B1 | 1/2011 |
| EP | 1 470 714 B1 | 5/2012 |
| WO | 00/31964 A1 | 6/2000 |
| WO | 00/49483 A1 | 8/2000 |
| WO | 01/69354 A2 | 9/2001 |
| WO | 03/663445 A1 | 7/2003 |
| WO | 03/065725 A1 | 8/2003 |
| WO | 03/065731 A1 | 8/2003 |
| WO | 2004/023717 A2 | 3/2004 |
| WO | 2004/032418 A2 | 4/2004 |
| WO | 2004/032478 A2 | 4/2004 |
| WO | 2004/032510 A1 | 4/2004 |
| WO | 2004/056114 A1 | 7/2004 |
| WO | 2004/062281 A2 | 7/2004 |
| WO | 2004/068858 A2 | 8/2004 |
| WO | 2004/070588 A1 | 8/2004 |
| WO | 2004/073292 A2 | 8/2004 |
| WO | 2004/073311 A1 | 8/2004 |
| WO | 2005/039098 A1 | 4/2005 |
| WO | 2005/079213 A2 | 9/2005 |
| WO | 2006/120535 A1 | 11/2006 |

OTHER PUBLICATIONS

International Organisation for Standardisation, "Information Technology—Generic Coding of Moving Pictures and Associated Audio," *ISO/IEC*, 13818-2, Mar. 25, 1994, cover, pp. 1-202.

International Standard, "Information Technology—Coding of Audio-Visual Objects—Part 2: Visual," *ISO/IEC*, 14496-2, Second Edition, Dec. 1, 2001, cover and pp. 1-157.

Fukuhara, T, et al., "Motion JPEG2000 Final Committee Draft 1.0," *ISO/IEC JTC*, 1/SC 29/WG1 N2117, Mar. 27, 2001, cover and pp. 1-42.

WGI, "Resolutions of the 13th WGI JPEG Geneva Meeting," *ISO/IEC* JTCI/SC29/WG1 N811, Mar. 23-27, 1998, pp. 1-5.

European Standard (Telecommunications Series), "Digital Video Broadcasting (DVB); Interaction Channel for Digital Terrestrial Television (RCT) Incorporating Multiple Access OFDM," *ETSI EN*, 301 958, v1.1.1 Mar. 4, 2002, cover and pp. 1-164.

\* cited by examiner

METHOD AND DEVICE FOR DISTRIBUTING SECURE DIGITAL AUDIOVISUAL CONTENTS BY INTEROPERABLE SOLUTIONS

RELATED APPLICATIONS

This is a §371 of International Application No. PCT/FR2007/050910, with an international filing date of Mar. 12, 2007 (WO 2007/104887 A2, published Sep. 20, 2007), which is based on French Patent Application No. 06/50829, filed Mar. 13, 2006.

TECHNICAL FIELD

This disclosure relates to the field of the distribution of audiovisual contents protected by means for protecting the contents. The disclosure more particularly concerns means for protecting the distribution of audiovisual contents through a telecommunication network or on a physical support such as a memory card or a DVD, and using the characteristics of the audiovisual compression format to enable interoperability between the various protection means.

BACKGROUND

To prevent the non-authorised piratical utilization of the digital contents, some solutions provide for the transmission to the user of digital audiovisual contents which is protected, scrambled and generally ciphered by one or several encoding key(s). The descrambling thus depends on the reception of a certificate or a licence which contains one or several descrambling key(s), the certificate or licence being generally sent to the user in exchange for a charged or free transaction. The certificate or licence generally contains legal elements relating to the possible utilization of the descrambled contents. One problem entailed in such solutions is that a user having powerful tools at their disposal can determine the descrambling key or keys without going through the transaction, and thus obtain a descrambled stream which can be used as desired, either for an illegal visualization or audio, or for making pirated copies. Another problem is that the user must have a terminal which incorporates the descrambling method as well as the so-called rights of use management method compatible with that used for scrambling the contents.

Some protective solutions enable the secure distribution of audiovisual contents through telecommunication networks or on audiovisual physical supports of the memory card or DVD types, more particularly using protection methods called DRM (Digital Rights Management) or CAS (Conditional Access System). Further in the following text, all the DRM and CAS will be called "DRM."

A DRM is a protection method implemented with a protection device comprising:
  protection means of a cryptographic kind;
  digital rights management means;
  means for the secure transmission of keys of the cryptographic kind.

However, several DRMs exist, among which some are standardized. However, the DRMs are incompatible with each other. A consumer receiving audiovisual contents protected by one DRM can play it only if the terminal has the method corresponding to the DRM: the interoperability of the contents and the interoperability of the protection systems (DRM, CAS) do not exist.

EP 0 778 513 discloses a method making it possible to prevent the illegal use of information by adding a control information to check the rights of the user. The system makes it possible to know permanently what part of the information is used, by which user, and thereby makes it possible to know whether the user is in a legal or illegal situation. Such method thus protects data by adding additional information which change the nature of the initial information, but the interoperability with the other DRM systems is not provided.

WO 00/49483 also provides methods and systems for creating a link between the users and a digital entity editor. The method comprises at least one of the following steps: the step of subdividing the digital entity into two parts; the step of storing a part in a memory area of a server connected to a computer network; the step of transmitting the other part to at least one user having a computer; the step of connecting the computer to the computer network; the step of establishing a functional link between the first part and the second part. Such methods and systems do not mention whether the part stored in the server can be stored by the user which would enable him to pirate the digital entity, and the interoperability with the other DRM systems is not mentioned.

U.S. Pat. No. 5,937,164 discloses separating a stream into two parts, the smaller one of which contains information required for using the bigger one. However, this method is not sufficient for answering the problem identified. As a matter of fact, the elimination of a part of the stream changes the format of the stream which can no longer be recognized as a standard stream, which could be used with general software applications. That method requires both a specific software on the server side for separating the two parts, and other specific software not only providing the reconstruction of the stream but also the acquisition of the main stream and the use thereof according to a solution proprietary format. Such proprietary format is not the initial format of the stream before it was separated into two parts. Interoperability with the other DRM systems is not provided.

The OMA (Open Mobile Alliance) consortium and more particularly, in the specifications of the OMA 2.0 DRM does not make it possible to solve the problem identified, since OMA defines how the original audiovisual sequence is completely ciphered, then how the rights are structured in a security object prior to being sent to the decoders. Interoperability with the other DRM is not solved by OMA.

Two possibilities exist to avoid such drawbacks: either the terminals have all the existing DRMs, and the terminals can thus remove the protection on and play contents protected by all the present DRMs, but the terminals will not be able to play the contents protected by unknown DRMs which will be used in the future; or the audiovisual contents to be protected are protected by all the existing and future DRMs, the contents having to be protected and broadcast with all the DRMs, which means extremely important protection and broadcasting costs, without allowing the interoperability of the DRM systems, nor the free exchange of files between terminals, since each terminal does not have all the DRMs.

In addition, some terminals such as personnel digital assistants or mobile telephones cannot have several DRMs for reasons of software and hardware architecture.

Thus, in the existing solutions, if it is desired to transmit audiovisual contents comprising several types of DRM protections, it is necessary to transmit the whole corresponding stream which corresponds to the audiovisual contents, protected according to the various DRM formats. The volume of information thus transmitted is thus equal to the size of the contents to be visualized multiplied by the number of the DRM types used. However, the transmission of such volume of information is a problem, more particularly in case of a transmission, because of the limited passbands and memories.

SUMMARY

We provide a method for distributing a nominal audiovisual stream to a recipient device including modifying, in the nominal audiovisual stream, at least one nominal coefficient among the nominal coefficients to generate a modified mean stream; generating complementary information such that the nominal audiovisual stream may be implemented from the complementary information and on the modified main stream; applying a plurality of methods for protecting the complementary information to generate multiple protected complementary information, each piece of the protected complementary information enabling the nominal stream of the main stream to be implemented upon application of an access method compatible with the protection method which has been used to protect it; and transmitting to the recipient device the modified main stream and the multiple protected complementary information.

We also provide a device for distributing a nominal audiovisual stream to a recipient device, the nominal stream including nominal coefficients, the device including means arranged to modify, in the nominal audiovisual stream, at least one nominal coefficient among the nominal coefficients to generate a modified main stream; means arranged to generate complementary information so that the nominal audiovisual stream is able to be implemented from the complementary information and the modified main stream; means arranged to apply a plurality of protection methods to the complementary information to generate a plurality of protected complementary information, each piece of the respective protected complementary information enabling the nominal stream to be implemented from the modified main stream in case of the application of an access method compatible with a respective protection method; and means arranged to transmit to the recipient device the modified main stream and the plurality of protected complementary information.

We further provide a device for receiving a nominal audiovisual stream distributed according to the method including access means arranged to access the complementary information from at least one piece of protected complementary information among the plurality of protected complementary information; and synthesis means arranged to combine the complementary information and the modified main stream to enable implementation of the nominal audiovisual stream.

BRIEF DESCRIPTION OF THE DRAWINGS

The methods and systems will be best understood upon reading the following description of a non-limitative exemplary embodiment, while referring to the appended drawings:

In FIGS. 1 to 3, identical references refer to similar technical characteristics.

DETAILED DESCRIPTION

Figure 1:
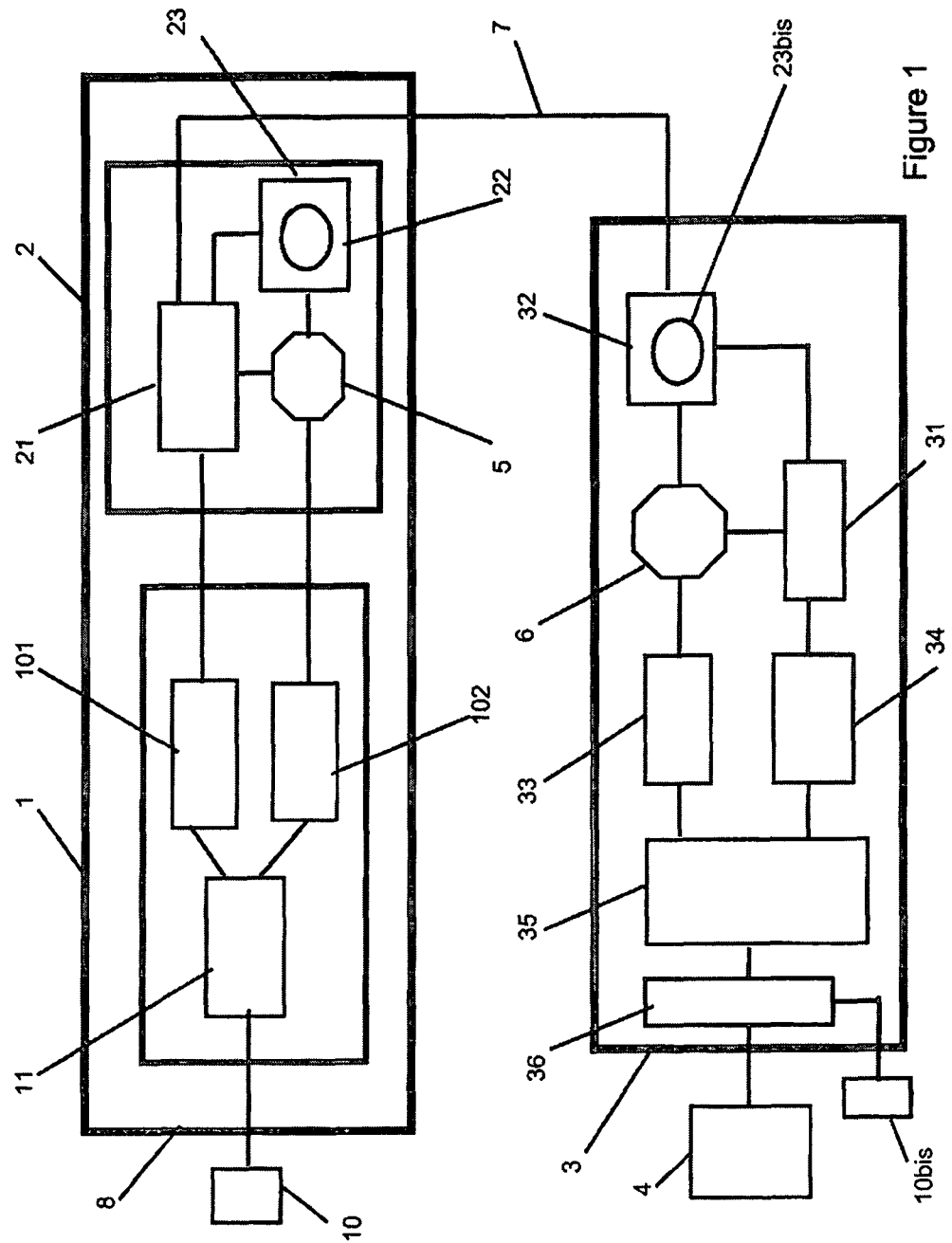
FIG. 1 shows a diagram of a server decoder assembly on which our method is implemented.

We provide a system making it possible to visually and aurally scramble and to reconstruct digital audiovisual contents distributed to the user. We provide a system enabling the user to use the protected audiovisual contents in a secure way thanks to a method making it possible to contain several interoperable protective solutions. The user will then be able to use non-scramble audiovisual contents in exchange for a transaction predefined by the distributors or to be defined upon the visualization of the audiovisual contents. We also make it possible to have a complete control of the use of the copies and the copyrights of the programs thus broadcast.

We provide methods for distributing a nominal audiovisual stream to a recipient device, the nominal audiovisual stream comprising nominal coefficients comprising:
  modifying, in the nominal audiovisual stream, at least one nominal coefficient among the nominal coefficients to generate a modified main stream;
  generating complementary information so that the nominal audiovisual stream is likely to be implemented from the complementary information and the modified main stream,
  applying a plurality of protection methods to the complementary information to generate a plurality of protected complementary information, with each piece of the respective protected complementary information enabling the nominal stream to be implemented from the modified main stream upon application of an access method compatible with the protection method which has been used to protect it; and
  transmitting to the recipient device the modified main stream and the plurality of protected complementary information.

Thus, the various protection methods, and more particularly of the DRM type, are applied to the complementary information. By nature, only DRM-compatible methods of access enable access to the complementary information from the protected complementary information. The modified main stream may then be transmitted to the recipient devices in an identical way and in a non-protected form, the rights of access by the various recipients being defined in the protected complementary information. Thereby, the application of a plurality of DRM protection types, which is preferred to make sure that the recipient has at least one of the DRM types making it possible to remove the protection of the contents; is applied only to the complementary information. As the complementary information is able to be of a much smaller size than the nominal stream, the quantity of data to be transmitted is thus reduced. Generally speaking, the volume of data to be transmitted is no longer proportional to the volume of the nominal contents multiplied by the number of protections applied, as in the existing solutions, but only to the volume of the complementary information multiplied by the number of protections applied. Such volume is thus likely to be much smaller, and typically one hundred times smaller for complementary information having a volume of at least 1% of the nominal contents.

The complementary information depends on the type of the audiovisual contents to be transmitted. Such complementary information may, for example, be generated as in WO 2004/032418 for an audio sequence, or as in WO 2003/063445 for an audiovisual sequence in the MPEG format, the subject matter of which is incorporated herein by reference. The complementary information may also include information customised according to the recipient such as in WO 2004/073311, or visible marking information such as in WO 2004/062281 or invisible marks, the subject matter of which is incorporated herein by reference. The modified main stream is preferably generated by retrieving at least one coefficient from the nominal stream and by inserting the extracted coefficient or coefficients into the complementary information.

In all cases, processing the complementary information and the modified main stream by a synthesis module makes it possible to implement the nominal stream, for example by reconstructing an identical stream, or by adding visible or invisible data, whereas the modified main stream cannot be implemented at the recipient device without the complementary information.

The method may further comprise a step of packing the modified main stream and the plurality of protected complementary information to form a packed stream, and the step of transmitting to the recipient device the modified main stream, and the plurality of protected complementary information includes a step of transmitting the packed stream.

This provides the additional advantage of enabling the transmission, in the form of a unique stream, of the plurality of protected complementary information. Another important advantage for the user is the possibility of implementing a content thus acquired on a plurality of devices containing different DRM protection means.

The step of transmitting to the recipient device the modified main stream and the plurality of protected complementary information may include a plurality of steps of transmitting each piece of complementary information on separate channels.

This offers the additional advantage of making it possible to supply the protected complementary information on demand from the recipient, more particularly depending on the type of the protection system of the recipient device. Thus, if the recipient does not have one the DRMs associated with the complementary information protected by such DRM, the user can obtain such DRM and the complementary information protected by such DRM without necessarily receiving the other protected complementary information or the modified main stream. More particularly, the modified main stream may be transmitted separately from each piece of the protected complementary information.

We also provide devices for distributing a nominal audiovisual stream to a recipient device, the nominal audiovisual stream comprising nominal coefficients comprising:
  means arranged to modify, in the nominal audiovisual stream, at least one nominal coefficient among the nominal coefficients to generate a modified main stream;
  means arranged to generate complementary information, so that the nominal audiovisual stream is able to be implemented from the complementary information and the modified main stream;
  means arranged to apply a plurality of protection methods to the complementary information, so as to generate a plurality of protected complementary information, with each piece of the respective protected complementary information enabling the nominal stream to be implemented from the modified main stream upon the application of an access method compatible with the protection method which has been used to protect it; and
  means arranged to transmit to the recipient device the modified main stream and the plurality of protected complementary information.

According to one alternative, the decoder, which receives such packed complementary digital information with the modified main stream, integrates at least one means of access to the complementary digital information compatible with that used during the protection step.

According to another alternative, the server transmits to a decoder, in addition to the complementary digital information packed with the modified main stream, means for protecting the complementary digital information compatible with that used upon the protection step.

The step of selecting the digital rights may be carried out depending on the characteristics of the decoder. The step of selecting the digital rights may be carried out depending on the characteristics of the original audiovisual sequence.

The digital rights may be packed with the complementary digital information. The decoder may request the server to send it the protected complementary digital information with at least one of the protection means that the decoder has.

The step of selecting the protection means for protecting the complementary digital information is carried out depending on the protection means of the decoder. The protection means may be sent to a physical support means. The step of transmitting the complementary digital information may be carried out using a physical support.

The step of transmitting the modified main stream may be carried out using a physical support. The step of transmitting the packed complementary digital information together with the modified main stream may be carried out using a physical support.

The decoder may create a private copy of the audiovisual sequence identical to the original, according to the digital rights received. The decoder may create a copy of the packed complementary digital information together with the modified main stream on a physical support.

We also provide systems for distributing audiovisual contents which are protected by protection means for the implementation of the method that includes at least a module for separating the original audiovisual sequence, at least means for protecting and managing the digital rights of the complementary information, a module for packing the complementary information thus protected together with the modified main stream, the transmission of the stream thus packed to a decoder having at least means for protecting and reconstructing the original audiovisual sequence from the modified main stream and the complementary information from which protection has been removed.

The general principle of a method for protecting an audiovisual stream is described hereinafter. The methods authorize audiovisual on demand and pay-per-view services through all the broadcasting networks and the local recording in the memory of the user's digital decoder housing, whereas the decoder housing may be a decoder connected to a TV set, a personal computer of the PC or MAC types, a pocket terminal such as a telephone or else a personal assistant of the PDA type. The methods protect, using one or several DRM(s), a very small part of the audiovisual program, such part being of utmost importance to be able to listen to and/or to visualize the audiovisual program on a screen, but whose volume is very low (approximately 1%) with respect to the total volume of the digital audiovisual program which will not be protected against a broadcasting or a copy.

The missing part protected by one or several DRM(s) is either re-integrated into the bigger part of the audiovisual stream to reconstruct a standard audiovisual contents, only a small part of which is thus protected by a DRM, or packed with the bigger part of the audiovisual stream and for example added to the complementary data or to the meta data of the file including the modified original audiovisual stream, or transmitted on the broadcasting and transmission network upon the visualization of the digital audiovisual program.

In this case, the missing part protected by a DRM is sent on demand via a telecommunication narrowband network, such as the conventional telephone networks or the cellular networks of the GSM, GPRS or UMTS types, or by using a very small part of a network of the DSL or BLR types, or else by using a sub-assembly of the shared passband on a wired network or a satellite network.

The major part of the audiovisual stream is distributed free to the users and between the users in a physical way on any support of the memory card, CD, DVD types or the like. The major part of the audiovisual stream can be played by a conventional drive for this type of support (CD-ROM and/or DVD drive, memory card drive).

According to an alternative, the major part of the audiovisual stream is transmitted via a conventional telecommunication or broadcasting network.

Thus, the user never has the whole original audiovisual stream in a non-protected digital form on the device, and cannot reproduce it illegally. In the following text, the major part distributed to the user is called the "modified main stream." The missing part is called the "complementary digital information."

In FIG. 1, the user's audiovisual decoder 3 is adapted to connect at least one display and audio device, for example, a monitor, an audiovisual projector, or a device of the TV set screen type 4, to at least one interface with the transmission and broadcasting network 7 or to a physical supports drive 32. This arrangement is composed of a decoder module 3 mainly comprising, on the one hand, a processing unit adapted for processing, and more particularly decoding and descrambling any digital audiovisual stream according to a pre-loaded decoding and descrambling software program called a DRM 6, and on the other hand, at least an interface with a screen 4 and optionally an interface for the connection to a local or extended network 7.

As shown in FIG. 1, the decoder 3 is connected to a transmission and broadcasting network 7 such as a modem, a satellite modem, a cable modem, a line interface to wireless telecommunication networks GSM, GPRS, UMTS, with an optical fibre or a radio or infrared interface for wireless communications.

The contents of the audiovisual programs such as films or any other audiovisual or multimedia sequence will be transmitted on this conventional connection for audiovisual broadcasting. However, to prevent pirated copies, prior to transmitting the audiovisual contents from the server 1, a small part of the audiovisual contents 102 is kept in the server 1. Similarly, if the audiovisual contents is distributed through a physical support like a memory or a disk 23 and not only through a wideband transmission and broadcasting network 7, a small part of the audiovisual contents is removed therefrom before it is recorded on the support 23.

In the case of the visualization of an audiovisual program in real time via a telecommunication network, such small part of the audiovisual contents kept in the server 1 will be protected by a DRM 5 compatible with the DRM 6 of the decoder 3 and then sent to the module 3 via the telecommunication network 7.

According to an alternative, such small part of the audiovisual contents kept in the server 1 will be protected by a DRM 5 and then transmitted to the module 3 using a physical support like a memory card 23 recorded by the recording module 22 which can record memory cards, CDs or DVDs as well.

Our methods and system will be better understood upon reading an example, while referring to the appended drawings. In this example, the audiovisual content undergoes a first step of analysis. The incoming digital audiovisual stream 10 is sent to the analysis device 11 which uses the characteristics of the format of the audiovisual coding of the stream 10 to determine a modified main stream 101 and complementary digital information 102. The modified main stream 101 has the same format as the incoming stream 10, but has been brought modifications of some parameters. The modified main stream can thus be played on a standard drive having this format, but the display of the corresponding audiovisual contents is not correct from the point of view of the human perception. In the case of the MPEG digital audiovisual standard, the modifications brought to the incoming stream 10 may be: substitution of some DC coefficients of certain blocks, substitution of the information on the motion adjustment, substitution of the scanning order of the coefficients of some images, etc. The complementary digital information 102 retrieved is then approximately 1% of the data of the modified main stream 101 to almost totally scramble, visually and/or aurally, original audiovisual contents 11.

The modifications brought and the original information, if any, replaced in the modified main stream 101 are stored in the complementary digital information 102 to be subsequently protected by a DRM 5.

A user having a client device 3 can read any audiovisual contents from the telecommunication network 7 or from the physical support drive 32. When the user wishes to visualize the original audiovisual stream 10, the user can do so only by recovering the complementary digital information 102.

The implementation of an audiovisual content may be conditioned by digital rights. Digital rights represent the information which indicates the conditions in which the contents may be implemented: (a) the number of the contents implementations, (b) the date of validity from which the contents can be implemented, (c) the date of expiry from which the contents may no longer be implemented, (d) other types of rights, such as the domain for which the implementation is authorized, the type of decoder 3 which makes it possible to implement it, etc.

Digital rights on the implementation of the main digital stream may be stored with the complementary digital information 102 by the DRM module 5 in the protected complementary digital information transmitted to the multiplexer 21 or the recorder 22.

The complementary digital information 102 as well as the modified main stream 101 may thus arrive indifferently in the decoder 3, together or separately, through the telecommunication network 7 or through a physical support 23bis, read by the drive 32 of its client device 3.

In a first example, we examine the case where the modified main stream 101 is recorded with or without the complementary digital information 102 in a physical module 23, from the recorder 22.

It should be noted that, when a user of the decoder 3 wishes to visualize the original audiovisual stream 10, the user can do so only by retrieving the complementary digital information 102, or else the user will be able to visualize and hear the modified main stream 101 only.

Figure 2:
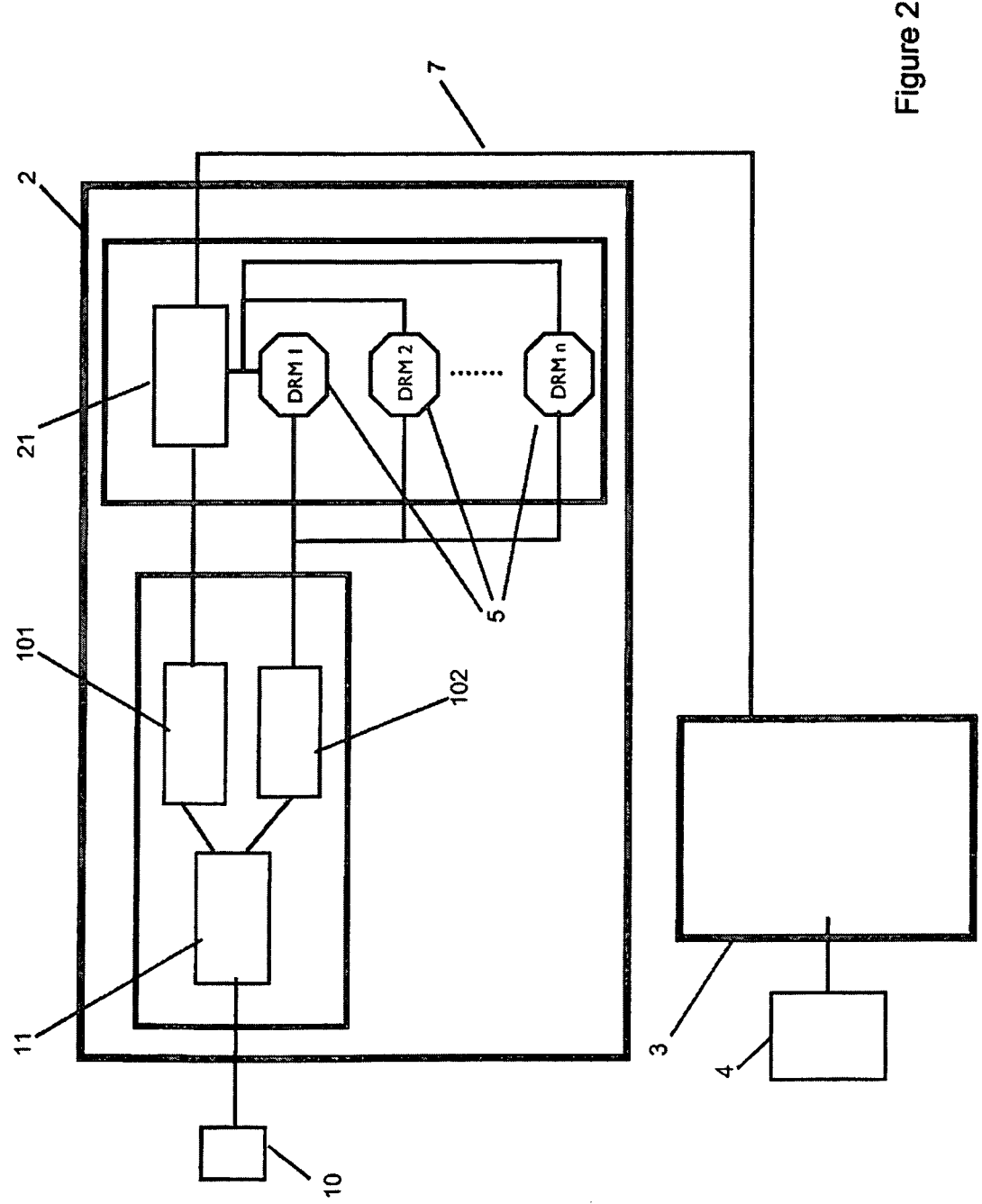
FIG. 2 shows an example wherein the protected complementary information is packed with the modified main stream and transmitted therewith.

FIG. 2 shows an example wherein the complementary information 102 is protected by a plurality of distinct DRMs 5, referenced DRM 1 to DRM n to generate a plurality of protected complementary information. Such protected complementary information is packed with the modified main stream 101 at the multiplexer 21. The packed stream thus obtained is then transmitted through the link 7 with the decoder 3.

Figure 3:
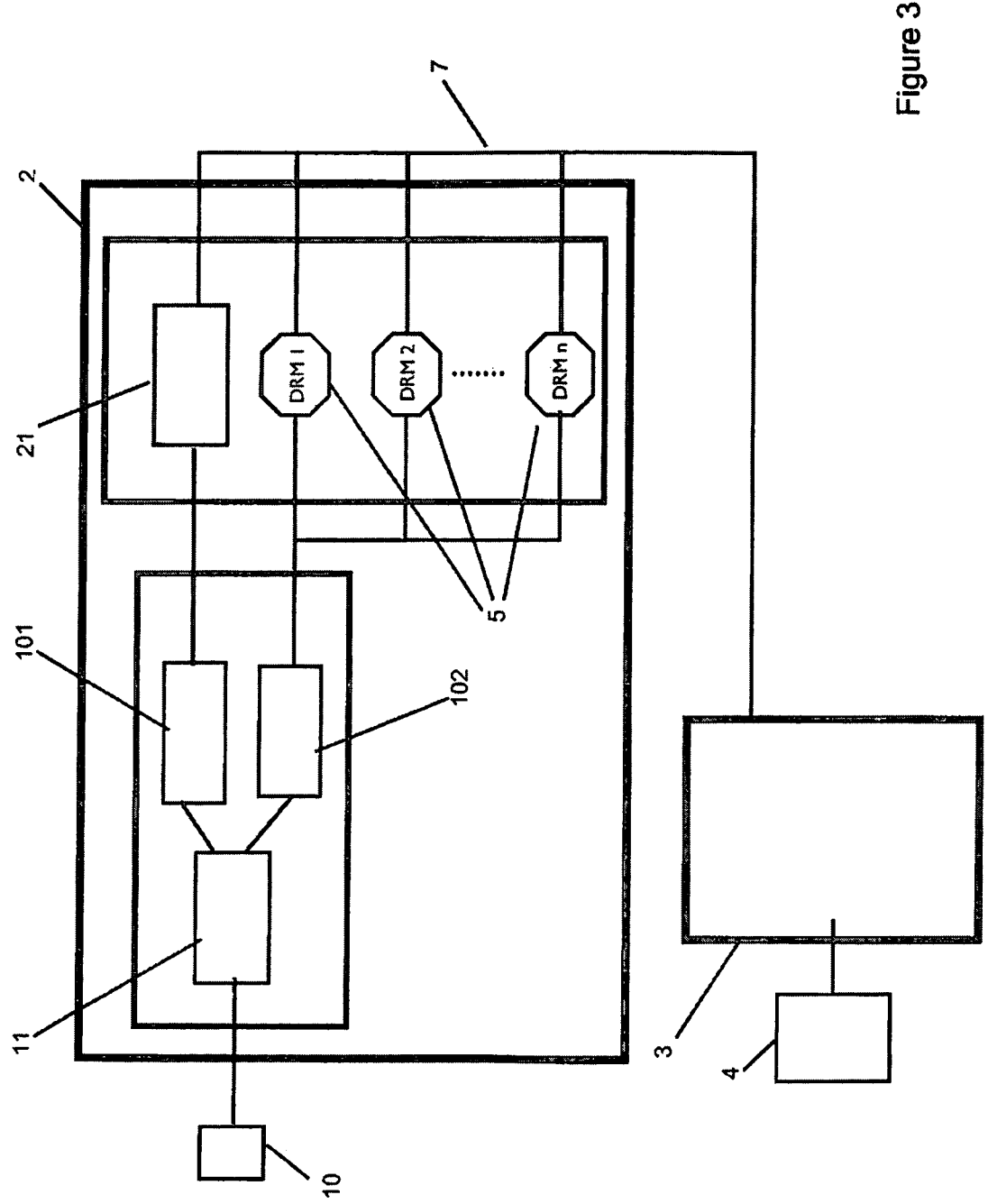
FIG. 3 shows another example wherein the protected complementary information is transmitted independently from the modified main stream.

FIG. 3 shows another example. The complementary information 102 is also protected by a plurality of distinct DRMs 5, bearing reference number DRM 1 to DRM n to generate a plurality of protected complementary information. However, the protected complementary information are not packed with the modified main stream 101 and are transmitted through the link 7 independently of the modified main stream 101, which is different from the previous embodiment referring to FIG. 2. In this example, the multiplexer 21 is thus an option and may be deleted from the protection module 2.

For a user who wishes to read contents recorded on a physical support 23*bis*, from a decoder 3 having one or several DRM modules 6, three cases may occur:

1—the physical support 23*bis* contains the complementary digital information 102 packed with the modified main stream 101 and protected by a plurality of DRMs 5 compatible with at least one DRM 6 module used by the decoder 3, as illustrated in FIG. 2;

2—the physical support 23*bis* contains the complementary digital information 102 packed with the modified main stream 101 and protected by a plurality of DRMs 5 non compatible with a DRM 6 module used by the decoder 3, as illustrated in FIG. 2; or 3—the physical support 23*bis* only contains the modified main stream 101, as illustrated in FIG. 3.

Analysis of these Three Cases:

1—if the complementary digital information 102 has been protected by a DRM 5 compatible with at least one DRM module 6 of the decoder 3 and packed with the modified main stream 101, the drive 32 will read the physical support 23*bis* and transmit the contents thereof to the multiplexer 31 which in turn transmits on the one hand the modified main stream 101 towards the buffer memory 34 and on the other hand the complementary digital information 102 protected by the DRM 5 compatible with the DRM 6 of the decoder 3, towards the DRM 6 module.

Depending on the digital rights contained in the complementary information 102, the DRM module 6 removes the protection of the complementary digital information 102 and transmits it to the buffer 33.

The synthesis device 35 then receives the portion of the complementary digital information through the buffer 33 and the portion to be displayed of the modified main stream through the buffer memory 34. From the complementary digital information 102 and the modified main stream 101, the synthesis device 35 reconstructs a stream strictly identical to the original stream 10 and transmits it to a conventional decoder 36 having the format of the original stream. The decoded stream is thus displayed on the display screen 4.

Advantageously, the decoded stream is sent to a recording module 10*b* is to make a private copy of the contents on a physical support such as a DVD, a CD or a memory card.

2—If the complementary digital information 102 has been protected by a DRM 5 not compatible with a DRM module 6 used by the decoder 3, and packed with the modified main stream 101, the drive 32 will read the physical support 23*bis* and transmit the contents thereof to the multiplexer 31 which in turn transmits on the one hand the modified main stream 101 towards the buffer memory 34 and on the other hand the complementary digital information 102 protected by the DRM 5 non-compatible with the DRM 6 of the decoder 3, towards the DRM module 6.

The DRM module 6 acknowledges the non-compatibility with the DRM 5 used and thus its inability to remove the protection of the complementary digital information 102.

Depending on an application which is not described herein, the decoder 3 informs the user that the user does not have the right to visualize such contents, and optionally offers the user to log in to a server to retrieve the complementary digital information 102.

The decoder 3 then connects through the network 7 to the protection module 2 in an automatic way or under the user's control to indicate that the user wants to receive the complementary digital information 102 and that the user has the DRM modules 6 in decoder 3.

The protection module 2 then selects a DRM module 5 compatible with at least one DRM module 6 of the decoder 3 to protect the complementary information 102 prior to sending it to the decoder 3 through the connection 7.

The protection module 2 may load into the decoder 3 a new DRM module 6 compatible with the DRM module 5 which has been used to protect the complementary digital information 102.

The multiplexer 31 then transmits the complementary digital information 102 protected by the DRM 5 compatible with the DRM 6 of the decoder 3, to the DRM module 6. The DRM module 6 removes the protection of the complementary digital information 102 and transmits it to a buffer 33.

The synthesis device 35 thus receives the portion of complementary digital information through the buffer 33 and the portion to be displayed of the modified main stream through the buffer memory 34. From the complementary digital information 102 and the modified main stream 101, the synthesis device 35 reconstructs the stream strictly identical to the original stream 10 and transmits it to a conventional decoder 36 having the format of the original stream. The decoded stream is displayed on the display screen 4.

3—If the physical support 23*bis* only contains the modified main stream 101, the drive 32 reads the physical support 23*bis* and transmits the contents thereof to the multiplexer 31 which in turn transmits the modified main stream 101 to the buffer memory 34.

The DRM module 6 notes that there is no complementary digital information 102.

As a function of an application which is not described herein, the decoder 3 informs the user that the user has no right to see this content, and optionally offers the user to log in to a server to retrieve the complementary digital information 102.

As in the previous case, in an automatic way or under the user's control, the decoder 3 then connects via the network 7 to the protection module 2 to indicate that it wants to receive the complementary digital information 102 and that it has such DRM modules 6 in its decoder 3.

The DRM module 5 then selects a DRM module compatible with at least a DRM module 6 of the decoder 3 to protect the complementary information 102 prior to sending it to the decoder 3 via the link 7.

Advantageously, the protection module 2 loads into the decoder 3, a new DRM module 6 compatible with the DRM module 5 which has been used for protecting the complementary digital information 102.

The multiplexer 31 then transmits the complementary digital information 102 protected by the DRM 5 compatible with the DRM 6 of the decoder 3, to the DRM module 6. The DRM module 6 removes the protection of the complementary digital information 102 and transmits it to the buffer 33.

The synthesis device 35 thus receives the portion of the complementary digital information through the buffer 33 and the portion to be displayed of the modified main stream through the buffer memory 34. From the complementary digital information 102 and the modified main stream 101, the synthesis device 35 reconstructs a stream which is strictly similar to the original stream 10 and transmits it to a conventional decoder 36 having a format similar to the original stream. The decoded stream is displayed on the display screen 4.

In a second example, the modified main stream 101 is transmitted with or without the complementary digital information 102 to the decoder 3 via the telecommunication network 7.

This telecommunication network is a conventional telephone network or a cellular network of the GSM, GPRS or UMTS types, or a network of the DSL or BLR types, or a wired or satellite network.

For a user wishing to read in clear the contents from the network 7, from the decoder 3 having one or several DRM modules 6, three cases may then occur:

1—the network 7 transmits the complementary digital information 102 packed with the modified main stream 101 and protected by a plurality of DRMs 5 compatible with at least a DRM module 6 used by the decoder 3, as illustrated in FIG. 2;

2—the network 7 transmits the packed complementary digital information 102 with the modified main stream 101 and protected by a plurality of DRMs 5 not compatible with a module DRM 6 used by the decoder 3, as illustrated in FIG. 2; or 3—the network 7 only transmits the modified main stream 101, as illustrated in FIG. 3.

Those skilled in the art will immediately realize that these three cases are similar to the three preceding ones when substituting what is received by the network 7 for what is recorded on the physical support 23bis.

The decoder 3 may record on a physical support 23bis the complementary digital information 102 packed with the modified main stream 101 and protected by one or several DRMs. The decoder 3 may also record on the physical support 23bis the digital rights protected by one or several DRMs.

The interoperability between the various DRM systems is thus provided by the fact that the modified main stream 101 is sent at no charge to all the decoders 3 and that only a small part approximately 1% is protected by one or several DRMs 5 prior to being sent with decoding terminals 3 having a DRM 6 compatible with the DRM 5.

Each piece of complementary digital information 102 may be customized for each user of a decoder 3. The protection module 2 may record on the physical support 23 one or several DRM modules 6. The decoder 3 may update its DRM modules 5 from the physical supports 23bis which contain the DRM modules 5. The decoder 3 may update its DRM modules 5 from the protection module 2.

The invention claimed is:

1. A method for distributing a nominal audiovisual stream comprised of nominal coefficients to a recipient device comprising:

Extracting and replacing, in the nominal audiovisual stream, at least one nominal coefficient among the nominal coefficients to generate a modified main stream having a same format as the nominal audiovisual steam;

generating complementary information which forms a stream separate from the modified main stream;

inserting the extracted nominal coefficient into the complementary information such that the nominal audiovisual stream may be reconstructed from the complementary information and the modified main stream;

generating at least one copy of the complementary information;

applying to each copy of the complementary information a different protection method to generate multiple sets of protected complementary information, each set of protected complementary information pertaining to a different conditional access method and each set enabling the nominal audiovisual stream to be reconstructed by substituting into the modified main stream the nominal coefficients contained in the complementary information upon application of an access method compatible with the protection method which has been used to protect the complementary information; and transmitting to the recipient device the modified main stream;

determining the protection method pertaining to the recipient device, requesting the complementary information protected according to the determined protection method, and transmitting to the recipient device the protected complementary information pertaining to the recipient device.

2. The method according to claim 1, wherein transmitting to the recipient device the modified main stream and the plurality of protected complementary information includes a plurality of transmission steps for each set of the protected complementary information on separate channels.

3. The method according to claim 1, further comprising packing the modified main stream and the plurality of protected complementary information to form a packed stream, and wherein transmitting to the recipient device a modified main stream and the plurality of protected complementary information further comprises transmitting the packed stream.

4. A method of receiving a nominal audiovisual stream distributed according to the method of claim 1, comprising:

accessing the complementary information from at least one set of protected complementary information among the plurality of protected complementary information; and combining the complementary information and the modified main stream to enable implementation of the nominal audiovisual stream.

* * * * *